(12) United States Patent
Nitschke et al.

(10) Patent No.: US 7,684,025 B2
(45) Date of Patent: Mar. 23, 2010

(54) AUTO-ADJUST OF IMAGING MODULE MECHANICAL SETUP

(75) Inventors: Gene M. Nitschke, Webster, NY (US); David Baum, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 737 days.

(21) Appl. No.: 11/551,077

(22) Filed: Oct. 19, 2006

(65) Prior Publication Data
US 2008/0143986 A1    Jun. 19, 2008

(51) Int. Cl.
*G01C 1/00* (2006.01)
(52) U.S. Cl. ................................. 356/139.03
(58) Field of Classification Search .......... 356/3.01–22, 356/28, 28.5, 139–139.1
See application file for complete search history.

(56) References Cited

U.S. PATENT DOCUMENTS

| | | | |
|---|---|---|---|
| 4,724,330 A * | 2/1988 | Tuhro | 356/614 |
| 5,101,278 A * | 3/1992 | Itsumi et al. | 348/357 |
| 5,208,873 A * | 5/1993 | Nakajima | 382/282 |
| 5,966,462 A * | 10/1999 | Linder et al. | 382/173 |
| 6,055,391 A | 4/2000 | Jackson et al. | |
| 6,593,995 B1 | 7/2003 | Hogestyn | |
| 7,019,825 B2 * | 3/2006 | Roh et al. | 356/139.03 |
| 2004/0207886 A1 * | 10/2004 | Spears | 358/474 |

* cited by examiner

*Primary Examiner*—Thomas H Tarcza
*Assistant Examiner*—Luke D Ratcliffe
(74) *Attorney, Agent, or Firm*—MH2 Technology Law Group

(57) ABSTRACT

An imaging member adjustment system for an imaging module includes an imaging field opposing the imaging module and positioning targets provided in connection with the imaging field. The imaging module includes an optical source generating an optical path, an imaging member responsive to input from the optical source, and a lens interposed between the imaging member and imaging field. At least one adjustment mechanism is operatively connected to the imaging member for adjusting the imaging member with respect to the imaging field. A controller operatively communicates with the imaging member and the at least one adjustment mechanism. In operation, the positioning targets interrupt the optical path and provide positioning information to the controller. In turn, the controller signals the at least one adjustment mechanism to adjust the imaging member in any of horizontal and vertical direction to optimize focus and alignment of the imaging member with respect to the imaging field.

18 Claims, 6 Drawing Sheets

AUTO-ADJUST OF IMAGING MODULE MECHANICAL SETUP

FIELD OF THE INVENTION

The present invention generally relates to adjustment of an imaging device with respect to an imaging field, and, more particularly, to three dimensional adjustment of the imaging device with respect to the imaging field.

BACKGROUND OF THE INVENTION

In most known types of imaging technology, alignment and focus of an imaging device as it relates to an imaging field, such as the document glass, are needed in order to yield quality imaging results. Typically, an imaging module for image reproduction will include numerous components such as lamps, lenses and mirrors, as well as the imaging device itself, thus crowding the confined cavity area of the imaging module and presenting a difficulty in adjusting the imaging device due to the space limitations. When working in such a confined space, a significant amount of resources are necessary to either precision machine or manually adjust each imaging device with respect to the imaging field. Lack of precise adjustments may result in poor or substandard image quality. It has been known to simply bias an imaging device against the document glass, however, this does not always provide optimal alignment and focus.

Furthermore, recovery from these problems can be difficult. For example, if one were to increase the size of the imaging module cavity to permit easier access to the imaging device, an overall miniaturization of a unit may be compromised. Further, problems continue to exist in the field where ongoing adjustments may be required of the imaging device according to imbalances in the unit or which require post sale adjustments to meet precision imaging tolerances.

Thus, there is a need to overcome these and other problems of the prior art and to provide multi-directional adjustment of an imaging device both within an imaging module and with respect to an imaging field, and more specifically to enable the adjustments post-assembly within the confined cavity space of the imaging module.

SUMMARY OF THE INVENTION

In accordance with the present teachings, a system for independently adjusting an imaging member within an imaging module is provided. The exemplary system can include an imaging field opposing the imaging module and positioning targets provided in connection with the imaging field. The imaging module houses an optical source generating an optical path, an imaging member responsive to input from the optical source, a lens interposed between the imaging member and the imaging field, at least one adjustment mechanism operatively adjusting the imaging member with respect to the positioning targets, and a controller operatively communicating with the imaging member and at least one adjustment mechanism. The imaging member outputs signal information to the controller in response to an interruption of the optical path by the positioning targets, the controller initiating adjustment of the imaging member in response to the output signal information.

In accordance with the present teachings, a method of adjusting an imaging member within an imaging module and with respect to an imaging field is provided. The exemplary method can include providing detectable targets in proximity to the imaging field and providing a three-dimensional adjustment system engaged with the imaging medium. Sensing a position of the imaging medium with respect to the detectable targets of the imaging field initiates a corresponding operation of the three-dimensional adjustment system. Operation of the three-dimensional adjustment system is terminated upon achieving alignment and focus of the imaging medium with respect to the detectable targets of the imaging field.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

The following description of various exemplary embodiments each independently adjusting an imaging member within an imaging module and methods according to this invention may refer to and/or illustrate a simplified imaging member, however, it should be appreciated that the principles of this invention, as outlined and/or discussed below, can be equally applied to any known or contemplated system usable to record or reproduce images using an imaging bar or the like beyond the imaging members specifically discussed herein.

For example, the exemplary embodiments described herein are equally applicable to systems where an imaging member is stationary and where an imaging member is movable. In each instance, it will be appreciated that the imaging member is typically separated from a document by a platen glass, or other transparent surface or lens, overlying the imaging member. In both the movable and stationary operation of the imaging member, an alignment with the platen glass and correct focus distance to the platen glass is critical to an optimum reproduction of the document.

Various exemplary embodiments of the systems and methods according to this invention enable automatic and independent adjustment of an imaging member within an imaging module. An exemplary imaging member is, for example, a Full-Width-Array (FWA) imaging sensor, as found in scanners, copiers, facsimile machines and/or other digital imaging devices.

Exemplary embodiments of the systems and methods herein use optical targets and micro-electromechanical systems (MEMs) to automatically perform alignment between the imaging member and imaging field (platen glass) as will be further described. It is intended in the following that use of the terms MEMs, micro, mini and the like are intended to be used interchangeably and are meant as relative terms to refer to a scale small enough to fit within an imaging cavity. Further, all small types of devices (mini, micro, MEMs) and their motors, cams, gears and levers, may be used in combination and interchangeably in the following depending upon the amount of motion desired.

The following description is one possible implementation of the design but should not be considered the only possible implementation.

Figure 1:
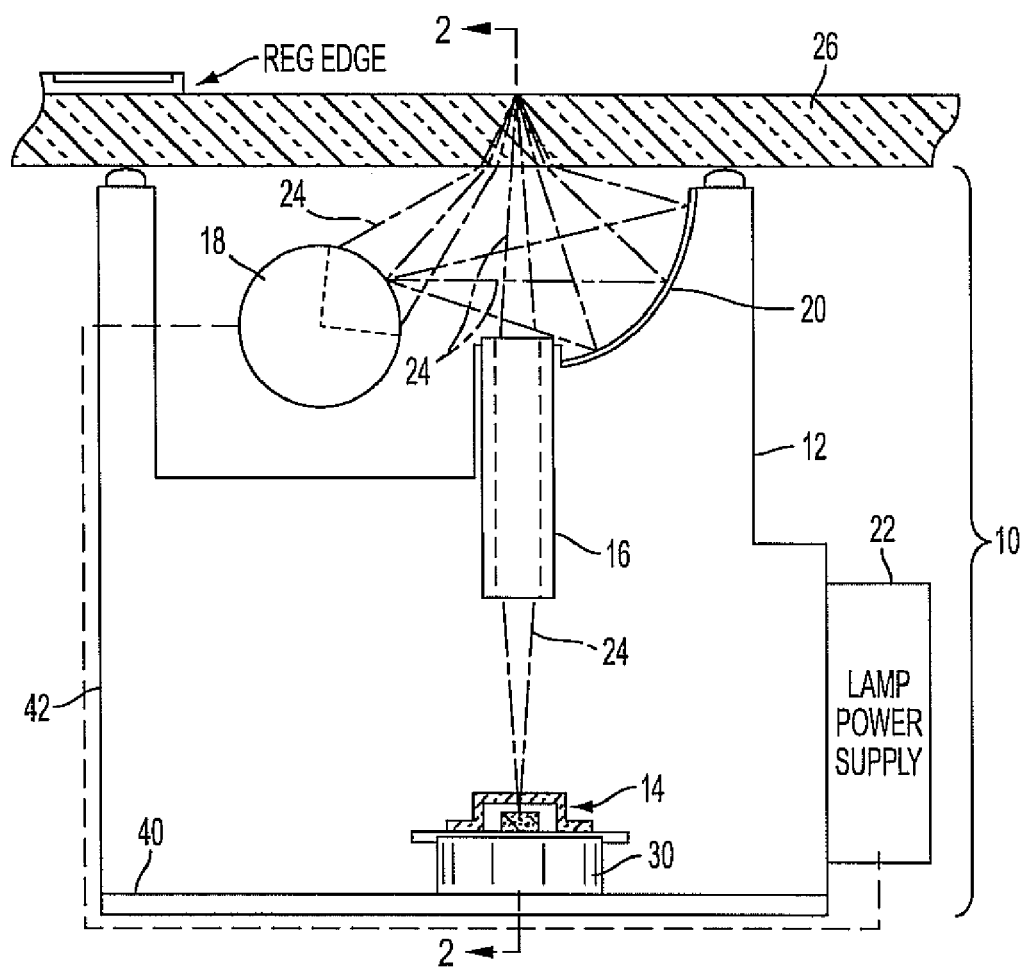
FIG. 1 is a front view depicting an exemplary imaging module in accordance with embodiments of the present teachings.

Referring first to FIG. 1, an exemplary imaging module 10 for an imaging unit (see FIG. 7 for example) is depicted. The imaging module 10 typically includes a cavity 12 and each of an imaging member 14, a lens 16, a lamp 18, a reflector 20 and a power supply 22 disposed within or connected to the cavity 12. The components typically direct an optical path 24 with respect to an imaging field 26, such as a document glass or platen. The exemplary imaging module 10 further includes a micro electro mechanical (MEMs) system 30 (hereinafter referred to as a "motion unit 30") for dimensionally adjusting the imaging member 14 with respect to the imaging field 26, all within the cavity 12 of the imaging module 10. Positioning targets 60 are provided on a surface of the imaging field 26 in the optical path 24. A controller 50 operatively communicates with the imaging member 14 and the motion units 30 such that the imaging member 14 outputs signal information to the controller 50 in response to interruption of the optical path 24 by the positioning targets 60. In turn, the controller 50 initiates adjustment to the imaging member 14 in response to the information.

In an exemplary embodiment, the imaging member 14 is a full-width-array (FWA) sensor such as that described in U.S. Pat. No. 5,113,260. As an alternative, the imaging member 14 may be a contact image sensor (CIS), a charge coupled device (CCD), or the like and provided in the imaging module 10 as described. In any event, the imaging member 14 must be correctly positioned within the imaging module cavity 12 and with respect to the imaging field 26 in order to output optimal images subsequent to a scanning or imaging process. An optimal image is that which is both focused and aligned upon reproduction.

In most instances, the imaging member 14 will be adjusted in three dimensions to include adjustment within a horizontal plane (an "X"-"Y" adjustment) and a vertical attitude ("Z") adjustment. The X-Y adjustment is intended to align the imaging member 14 with respect to the imaging field 26, and the Z adjustment is intended to optimize a focus distance between the imaging member 14 and the imaging field 26. These tolerances may spread over many inches yet be accomplished within a minimal space within the cavity 12.

The cavity 12 may be any suitable shape or size and include at least a base portion 40 and side walls 42. The imaging member 14 is typically confined to a small space in the cavity 12 which particularly limits access thereto. This limited access increases the difficulty of adjustment of the imaging member 14 within the cavity 12 for any of X, Y, or Z positioning with respect to the imaging field 26.

According to an exemplary embodiment, adjustment of the imaging member 14 within the cavity 12 is achieved by the use of the motion units 30. Each of the motion units 30 includes, for example, micro motors, gears, and cams. The gears may be of the rack and pinion type for lateral movement of the imaging member, and worm gears for vertical movement of the imaging member 14. In the following description, each of the gears, motors and cams of the motion units 30 may be operable alone or together at any one mounting location on the imaging member 14. It will be apparent that one of ordinary skill will not be limited to these types of gears and any suitable micro gear arrangement capable of imparting lateral and/or vertical motion to the imaging member 14 are intended to be included within the scope of the invention. It will also be appreciated that the gears, motors and cams will be selected in order to fit within the cavity 12 and according to ease of installation and operation for a particular imaging unit.

Figure 2:
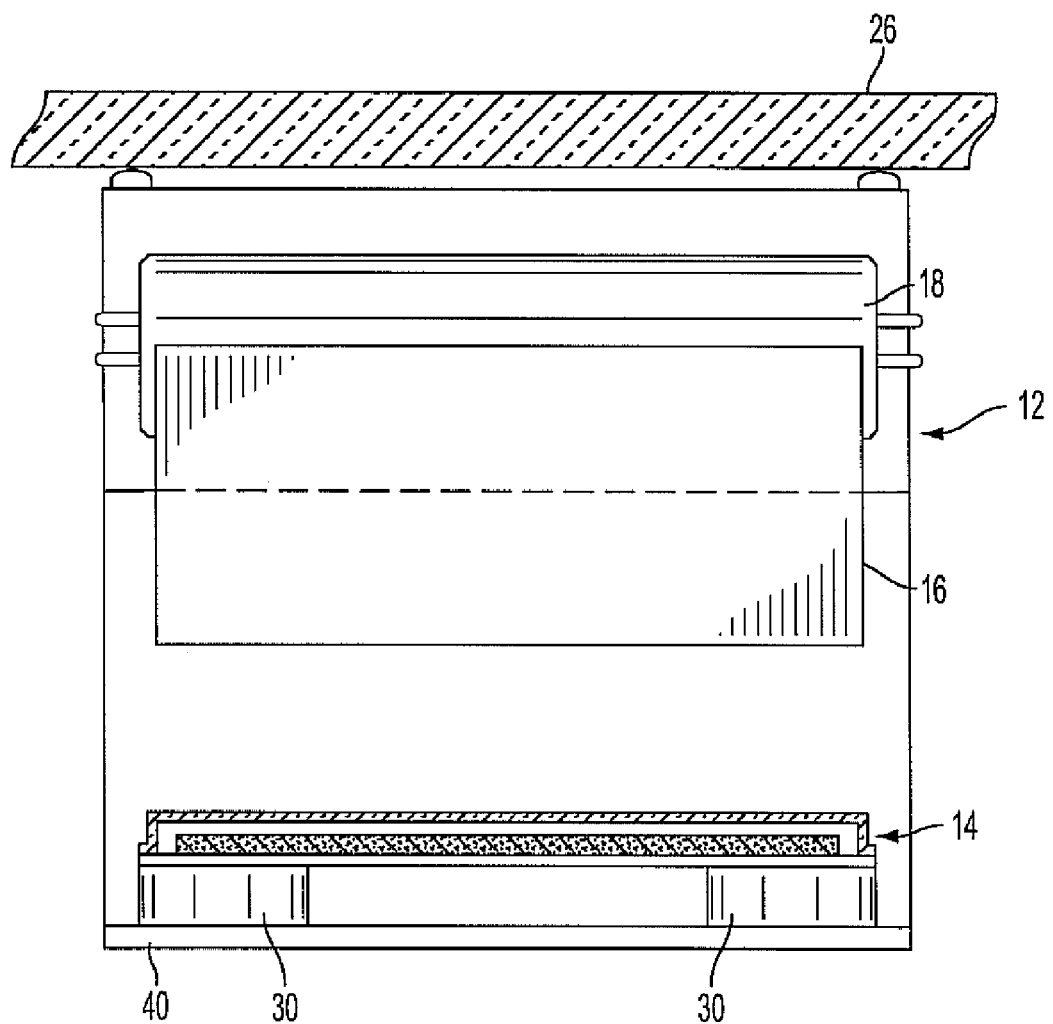
FIG. 2 is a side view of the exemplary imaging module of FIG. 1.
Figure 6:
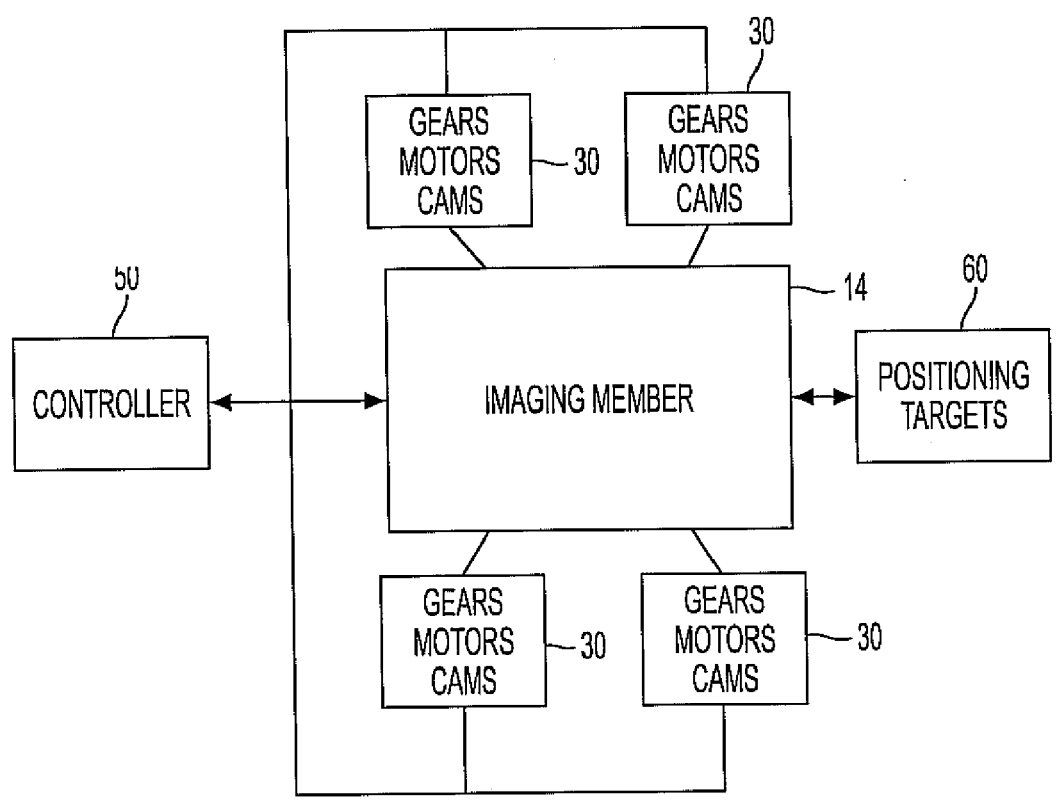
FIG. 6 is a diagrammatic view illustrating an adjustment control in connection with the exemplary imaging member.

Any number of motion units 30 needed to operatively maneuver the imaging member 14 will be connected to the sides, base, or top of the imaging member 14. By way of example, FIGS. 1 and 2 illustrate two locations of the motion units 30 as being operatively connected to the base of the imaging member 14 at two locations thereof. As shown in FIG. 6, by way of example, four motion units 30 are illustrated as being operatively connected to the imaging member 14. The respective motion units 30 may be selectively spaced around the imaging member 14 to obtain optimal lateral and/or vertical adjustment of the imaging member 14 for a particular imaging unit and are operable each alone or as a system. It will be apparent that the motion units 30 are operatively able to obtain simultaneous lateral and vertical adjustments of a corresponding portion of the imaging member 14.

The motion units 30 are each independently or serially connected to the controller 50, as best shown in FIG. 6. The controller 50 directs each motion unit 30 to impart minute adjustments to the imaging member 14, whether in a lateral or vertical direction, thereby obtaining an overall adjustment of the imaging member 14 within the cavity 12 and with respect to the imaging field 26.

The optical path 24 generated by the lamp 18 travels from the lamp 18 to the imaging field 26 and is then reflected from the imaging field 26 to the imaging member 14 as shown by the arrows in FIG. 1.

Figure 3:
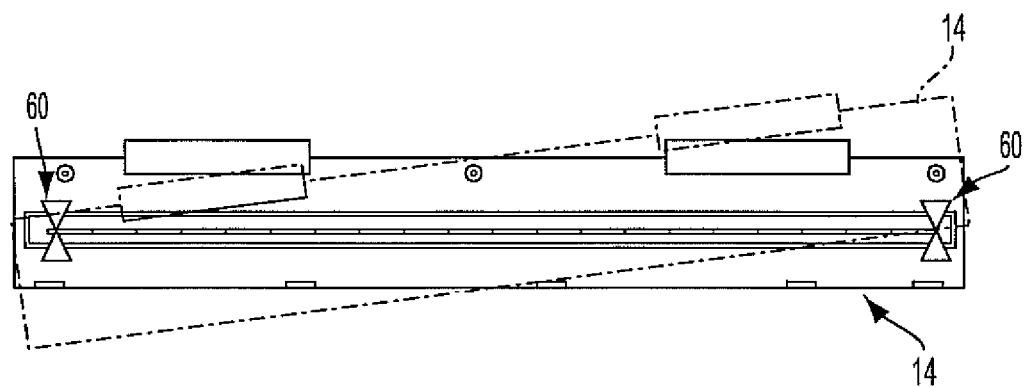
FIG. 3 is a top schematic view of an imaging member in accordance with embodiments of the present teachings.
Figure 4:
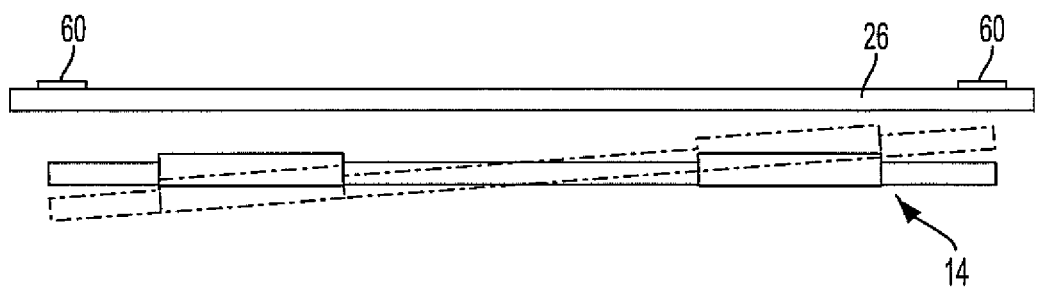
FIG. 4 is a side schematic view of the imaging member in relation to an imaging field in accordance with embodiments of the present teachings.

Referring again to the positioning targets 60, an exemplary embodiment illustrates a positioning target 60 at opposing ends of the imaging field 26. As is apparent from the top plan view of FIG. 3, positioning targets 60 are placed to interrupt the optical path 24. Accordingly, a predetermined portion of the optical path 24 will be reflected to the imaging member 14 and processed by the controller 50 to indicate a position of the imaging member 14 with respect to the imaging field 26. The positioning targets 60 may be movable into and out of the imaging field 26, or located at a fixed position outside of the typical imaging field 26.

The optical path 24 ultimately identifies both alignment and focus details of the imaging member 14 with respect to the imaging field 26. Adjustments of the imaging member 14 in lateral and vertical directions are continuously and automatically made until the signal received at the controller 50 indicates proper alignment and focus of the imaging member 14 with respect to the imaging field 26. The vertical adjustment of the imaging member 14 may occur simultaneously with the horizontal adjustment or independently of each other.

By way of example, a final horizontal adjustment occurs upon optimal alignment of the imaging member 14 between the positioning targets 60. The X-Y adjustments are achieved, for example, by using the micro motors to adjust the rack and pinion gearing on the imaging member 14 while monitoring the targets 60. Optimal alignment may be defined by minimal capture of the positioning targets 60. Typically, this will occur at a mid-point of the positioning targets 60.

Adjustments in the vertical (Z) direction are achieved, for example, by the micro motors adjusting worm gears on the imaging member 14 while monitoring the positioning targets 60. The micro motors adjust the imaging member 14 to achieve optimal focus of the targets 60 or optimal resolving power of a line target as shown in FIG. 5B. A final adjustment of the imaging member 14 in a Z direction occurs when there is optimal focus of the positioning targets 60.

Figure 5A:
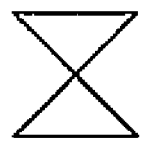
FIGS. 5A, 5B, and 5C depict exemplary positioning targets applicable to the imaging field in accordance with embodiments of the present teachings.
Figure 5B:
Figure 5C:
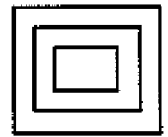

Several types of positioning targets 60 may be utilized, as shown by way of example in FIGS. 5A through 5C. Referring to FIG. 5A, a positioning target 60 in the shape of a vertical "bow-tie" is illustrated. In FIG. 5B, three vertical stripes are illustrated for use as positioning targets 60. In FIG. 5C, a rectangular bulls-eye is illustrated, alignment occurring at the center of the bulls-eye. The positioning targets 60 illustrated in FIGS. 5A through 5C are exemplary only and one of skill in the art will appreciate many alternatives thereof applicable to the exemplary embodiments.

As illustrated in FIG. 6, a communication between the imaging member 14 and the control unit 50, such as an internal processor, enables receipt of a signal identifying an alignment position and/or focus parameter of the imaging member 14 with respect to the positioning targets 60 on the imaging field 26 and operates selected MEMs components for minute and incremental adjustment of the respective gears for X-Y and/or Z adjustment of the imaging member 14.

Accordingly, in order to avoid the requirement for stringent precision tolerances at the time of machining, these precision tolerances can be achieved subsequent to assembly with automatic adjustments of the imaging member 14 internal to the imaging module cavity 12 using the MEM's motion units 30 responsive to signal information regarding the position of the imaging member 14 with respect to the positioning targets 60 of the imaging field 26. With the internal automatic adjustments, a significant reduction in tolerances is available for the mechanical design, assembly adjustment time may be reduced and final run and test (FR&T) time and customer service engineering (CSE) service calls may be reduced.

Figure 7:
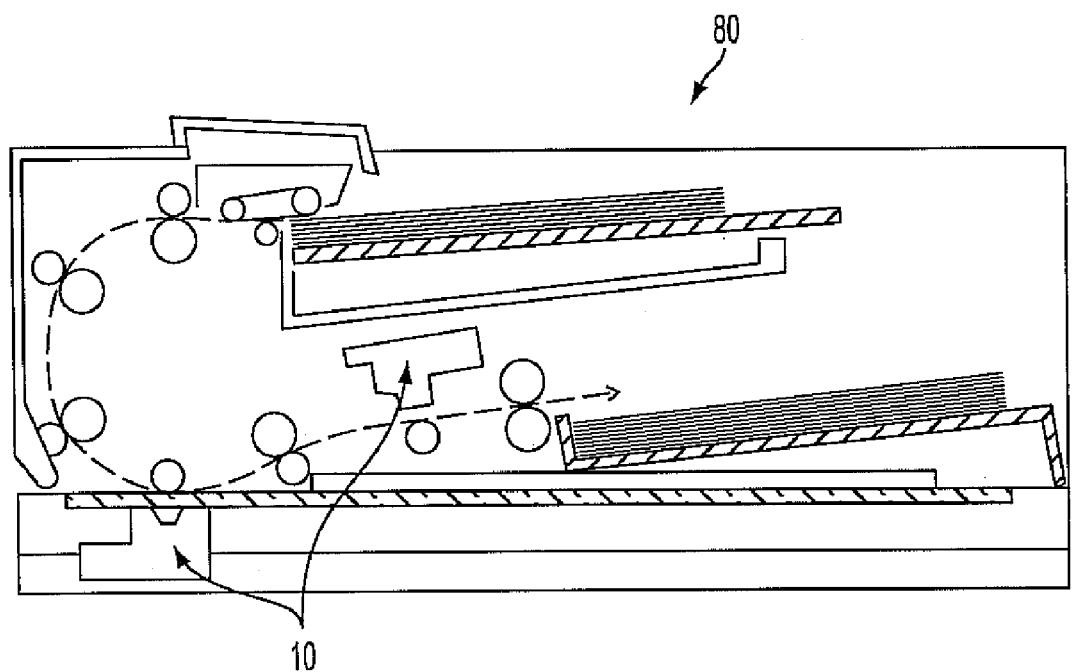
FIG. 7 is a side schematic view of imaging modules within a scanner type imaging unit in accordance with embodiments of the present teachings.

Referring to FIG. 7, an exemplary scanner 80 is illustrated. The scanner 80 includes two imaging modules 10, each imaging module 10 including the independently adjustable imaging member 14. It will be apparent that the imaging modules may be stationary or movable. According to the exemplary embodiments of the invention, the adjustable imaging member 14 for each imaging module 10 will be independently adjusted within the module to obtain optimal alignment and focus with respect to the imaging fields associated therewith.

Although the exemplary embodiments are described in connection with the full-width-array imaging bar, is will be apparent that these techniques may be applied to other imaging devices.

While the invention has been illustrated with respect to one or more exemplary embodiments, alterations and/or modifications can be made to the illustrated examples without departing form the spirit and scope of the appended claims. In addition, while a particular feature of the invention may have been disclosed with respect to only one of several embodiments such feature may be combined with one or more other features of the other embodiments as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." And as used herein, the term "one or more of" with respect to a listing of items such as, for example, "one or more of A and B," means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for independently adjusting an imaging member within an imaging module comprising:
   an imaging field opposing said imaging module;
   positioning targets provided in connection with said imaging field;
   said imaging module including:
      an optical source generating an optical path;
      an imaging member responsive to input from said optical source;
      a lens interposed between said imaging member and said imaging field;
      at least one adjustment mechanism operatively adjusting said imaging member with respect to said positioning targets to selectively optimize a focus distance between the imaging member and the imaging field and selectively align the imaging member with respect to the imaging field; and
      a controller operatively communicating with said imaging member and said at least one adjustment mechanism; and
   said imaging member outputting signal information to said controller in response to an interruption of the optical path by said positioning targets, said controller initiating adjustment of said imaging member in response to the output signal information.

2. The system of claim 1, wherein said at least one adjustment mechanism adjusts said imaging member in at least one of an X-direction, a Y-direction, and a Z-direction.

3. The system of claim 1, wherein said imaging member includes a sensor for converting the optical path to a signal identifying a position of said imaging member relative to said positioning targets.

4. The system of claim 1, wherein said at least one adjustment mechanism includes gears operable by motors, the gears directly connected to the imaging member.

5. The system of claim 4, wherein the gears include gears for lateral imaging member adjustment.

6. The system of claim 4, wherein the gears include gears for vertical imaging member adjustment.

7. The system of claim 1, wherein the positioning targets are positioned inside an imaging area of said imaging field.

8. The system of claim 1, wherein an optimal horizontal imaging position of said imaging member is defined by minimal target capture by said imaging member.

9. The system of claim 1, wherein an optimal vertical imaging position of said imaging member is defined by optimal focus of the targets by said imaging member.

10. The system of claim 1, wherein said imaging member is selected from a full-width-array imaging bar, a charge coupled device, and a contact image sensor.

11. The system of claim 1, wherein said imaging unit is a xerographic system.

12. The system of claim 1, wherein said imaging unit is a scanner.

13. A method of adjusting an imaging medium with respect to an imaging field, comprising:
   providing detectable targets in proximity to said imaging field, wherein the detectable targets are positioned in an optical path at extreme visual limits of said imaging medium;
   providing a three-dimensional adjustment system engaged with said imaging medium;
   sensing a position of said imaging medium with respect to the detectable targets of said imaging field;
   initiating a corresponding operation of the three-dimensional adjustment system in response to the sensed position;
   terminating operation of the three-dimensional adjustment system upon achieving alignment and focus of the imaging medium with respect to the detectable targets of said imaging field.

14. The method of claim 13, wherein sensing a position is continuous.

15. The method of claim 13, wherein the detectable targets are positioned within the imaging field.

16. The method of claim 13, wherein sensing a position includes adjusting a position of said imaging medium in response to interruption of the optical path by the detectable targets.

17. The method of claim 13, wherein said method is performed in a xerographic system.

18. An apparatus comprising means for performing the method of claim 13.

* * * * *